July 14, 1942.　　C. V. SMITH ET AL　　2,289,524

MOLD FOR SHAPING SHEETS OF PLASTIC MATERIAL

Filed Feb. 24, 1941　　2 Sheets-Sheet 1

INVENTOR
CHARLES V. SMITH
FRANK P. WILLIAMS
BY
ATTORNEYS

July 14, 1942.   C. V. SMITH ET AL   2,289,524
MOLD FOR SHAPING SHEETS OF PLASTIC MATERIAL
Filed Feb. 24, 1941   2 Sheets-Sheet 2
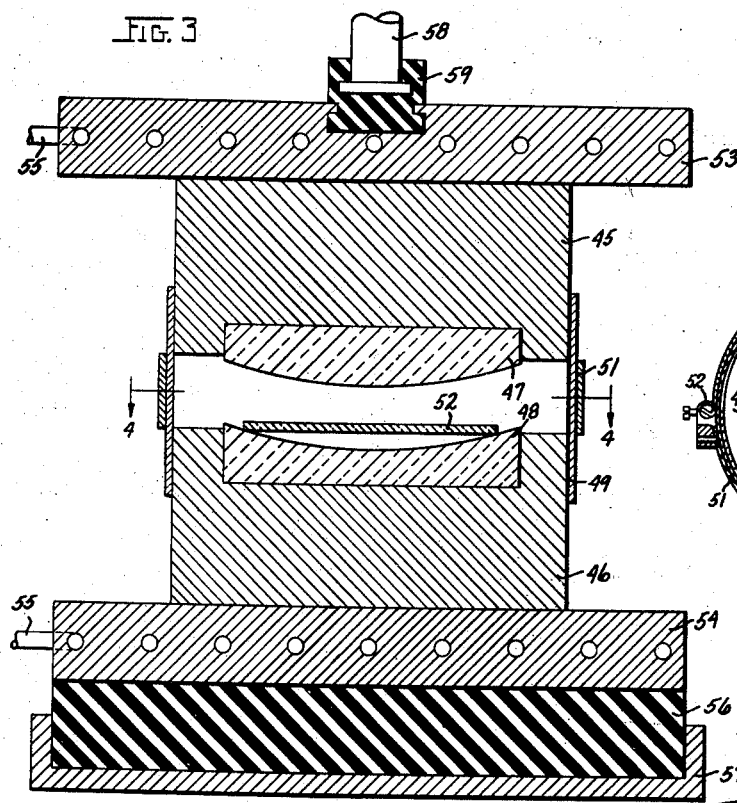
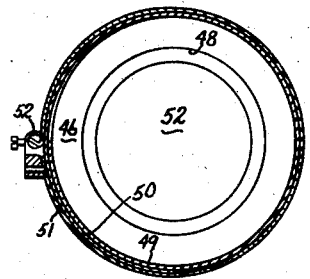
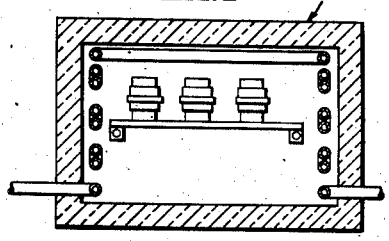
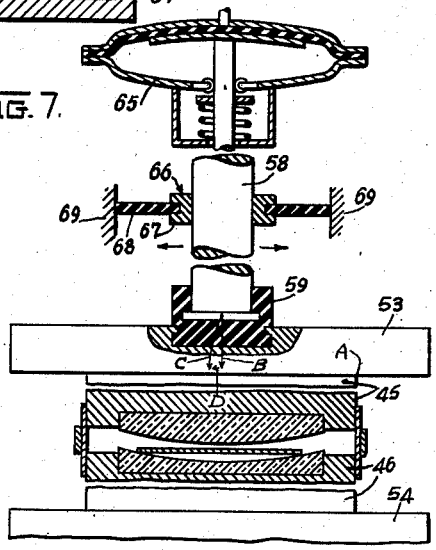
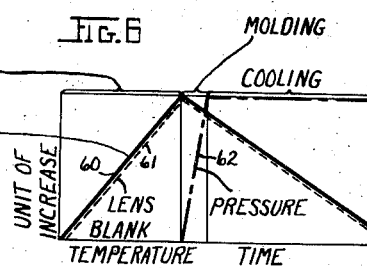
INVENTORS
CHARLES V. SMITH
FRANK P. WILLIAMS
BY
ATTORNEYS Patented July 14, 1942

2,289,524

UNITED STATES PATENT OFFICE 2,289,524

MOLD FOR SHAPING SHEETS OF PLASTIC MATERIAL

Charles V. Smith and Frank P. Williams, Dayton, Ohio, assignors to The Univis Lens Company, Dayton, Ohio, a corporation of Ohio Application February 24, 1941, Serial No. 380,150

13 Claims. (Cl. 18—17)

This invention relates to apparatus for producing unbreakable lenses from synthetic materials.

When producing lenses from synthetic materials, by deforming a blank of synthetic resin between forming dies, the usual practice heretofore has been to heat the blank of synthetic resin while within the forming press. This arrangement entails a long cycle of operation of a press in which a lens is to be formed, the cycle of operation including the entire period of heating, forming and subsequent cooling. Since the synthetic resins absorb heat relatively slow, the heating period of a blank of synthetic resin has required relatively prolonged periods of time. The press during this time is retained from operation and the process is extremely uneconomical.

The usual procedure heretofore followed in forming lenses from synthetic materials has been to position the forming dies securely within a press. The dies were heated, by any suitable means, to the temperature at which it was desired to work the blank of resinous material within the dies. A blank of resinous material, of suitable size and thickness, was positioned between the forming faces of the forming dies. These faces were provided with surfaces having an optical curvature of the desired shape which were arranged to cooperate to form the lens from the blank of resinous material positioned therebetween when closing pressure was applied upon the dies. The forming pressure was retained upon the dies over a period of time sufficient to alter the physical shape of the blank of resinous material until it conformed with the optical curvature of the dies. The dies were then cooled sufficiently to set the lens blank to altered shape.

This entire forming operation has heretofore been carried out upon a press which resulted in relatively long periods of idle operation of the press for lens forming purposes.

It is thus an object of this invention to provide an apparatus for forming a blank of resinous material wherein the apparatus is preheated with a blank of resinous material positioned therein before placing the same in the forming press.

It is another object of the invention to place a pre-heated pair of forming dies with a blank of resinous material therebetween within an unheated press, the residual heat of the dies retaining the blank within the range of forming temperatures for a sufficient time to permit formation thereof.

Another object of the invention is to pre-heat a pair of forming dies with a lens blank therebetween as a unit, elevating their temperature to a common level and subsequently pressing the pre-heated unit within a forming press.

Another object of the invention is to pre-heat a pair of forming dies with a resinous lens blank therebetween to a uniform elevated temperature and to subsequently apply pressure upon the dies for forming the resinous blank into a shape conforming with the optical curvature of the dies by deforming the blank at a rate which will not produce deleterious optical strain in the formed blank.

Another object of the invention is to provide a device for pre-heating a blank of resinous material wherein the die surfaces are retained in spaced relation with a resinous lens blank therebetween during pre-heating.

A still further object of this invention is to provide a pair of dies having optically curved surfaces thereon, with means for positioning the die surfaces in spaced relation so that a resinous blank of material can be inserted therein without having the die faces engage the same, whereupon the die elements and the lens blank can be elevated in temperature as a unit, and can be subsequently placed within a press for applying pressure upon the die for forming the resinous blank of material.

Another object of the invention is to provide a pair of dies having optical faces thereon with means for axially aligning the dies.

Another object of the invention is to provide a pair of dies in which a blank of resinous material can be pre-heated with means for axially aligning the same, and for permitting angular displacement of the optical surfaces of the dies to permit the same to assume proper relation with respect each other.

A still further object of the invention is to provide a device adapted to receive a pair of forming dies for altering the configuration of a blank of resinous material, which device is provided with means to permit the dies to alter the angular position of their optical surfaces, whereby the optical surfaces will assume their proper relation with respect each other.

A still further object of the invention is to provide a device in which a blank of resinous material can be pre-heated, the device comprising a pair of dies retained in spaced relation by a band encircling the dies and being retained thereagainst by frictional engagement.

Another object of the invention is to provide a device for pre-heating a resinous blank of material which encloses the blank during the various steps of pre-heating, forming and cooling to prevent dirt from entering between the die surface and the lens blank.

This application is a continuation-in-part of my copending application for a Method and apparatus for pre-heating lens making materials, Serial No. 355,490, filed September 5, 1940.

Further objects and advantages will appear from the description and the drawings.

In the drawings:

Figure 3 is a partial cross-sectional view of a press illustrating the formation of a lens within a press following the teachings of this invention.

Figure 4 is a cross-sectional view taken along line 4—4 of Figure 3.

Figure 5 is a diagrammatic cross-sectional view of an oven suitable for pre-heating die units.

Figure 6 is a curve chart representing the various steps of a method for forming optical articles wherein the forming press is not heated.

Figure 7 is a cross-sectional view of the press mechanism showing a resilient bearing support for the press plunger.

Figure 1:
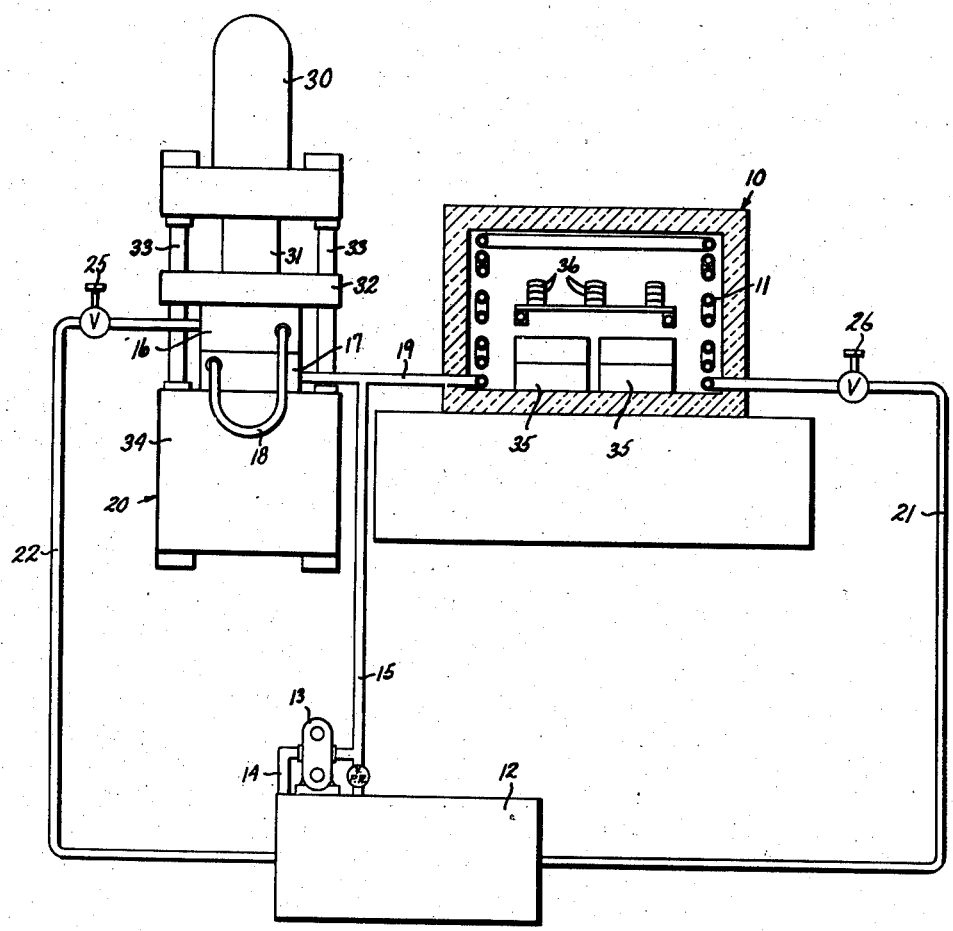
Figure 1 shows a diagrammatic system for carrying out the method of this invention.

This invention relates to an apparatus for forming blanks of synthetic resin into a configuration having optically curved surfaces or for forming optical planos.

In general, the apparatus consists of a pair of die members which have optically curved or plano surfaces thereon. These die members are retained in spaced relation during a pre-heating or temperature elevating period. A pair of die members with a resinous blank therebetween, comprises a unit which is positioned within an atmosphere maintained at an elevated temperature. The die elements and the resinous blank are elevated in temperature uniformly within the atmosphere, which atmosphere preferably brings the temperature of the resinous blank and dies to within a range of temperatures at which the lens blank can be altered in its physical shape.

Upon the dies and blank of resinous material reaching a determined temperature, or within a range of temperatures, the unit, consisting of the dies and blank, is removed from the high temperature atmosphere and positioned within a press. The press will apply pressure upon the dies to cause the same to engage the blank of resinous material, whereupon the blank will assume the configuration of the optical surface of the die. The press is provided with means for resiliently supporting the platens which engage the die members to permit the platens to shift angularly when the cooperating optical surfaces of the dies are brought into engagement with the resinous blank therebetween, whereby the optical surfaces will be aligned in their proper adjacent or parallel relationship.

In this invention we provide an oven or enclosure 10 which may be insulated for retaining heat therein. The enclosure 10 is provided with a plurality of heating coils 11 through which a heating fluid may circulate. While we mention the heating fluid with regard means for heating the enclosure 10, it is recognized that any means can be used for heating the interior of the enclosure 10. The heating means should be under control of a suitable controlling device for regulating the temperature of the enclosure 10.

In the present instance, a fluid tank 12 is provided. This fluid tank 12 is arranged with a suitable heating source therein, which is automatically controlled for maintaining the temperature of the fluid therein relatively constant. The heating source within the fluid tank 12, and the controls for the same, are well known in the art and further description thereof is not deemed necessary. A fluid pump 13 is connected to the fluid tank 12 and withdraws fluid therefrom through the conduit 14 and discharges same through the conduit 15.

The conduit 15 is connected to a conduit 19 which communicates with a mold carrying member 17 of the press 20. The mold or die carrying member 17 forms the lower half of a cooperating mold and die combination. The upper mold or die carrying member 16 is connected to the other mold or die carrying member 17 by means of a fluid circulating conduit 18. This conduit 18 permits the hot circulating fluid to be circulated through the die carrying members 16 and 17 in series and discharge from the upper die carrying member 16 through the discharge conduit 22. The fluid from the pump discharge conduit 15 also circulates through the conduit 19 connected with the heating coils 11 positioned with the heating enclosure 10. The fluid returns to the tank 12 from the heating conduits 11 through the conduit 21. While the heating circuits for the die carrying members 16 and 17 and the enclosure 10 have been described as being in parallel relation, it is also possible to arrange the circuit as a series circuit if desired.

We have heretofore mentioned the fluid tank 12 with regard a heating system, the heating fluid being circulated as heretofore described. It may also be considered that the tank 12 may contain apparatus for cooling a fluid for circulating through the mold carrying members 16 and 17 for cooling the same during certain cycles of operation in the formation of a lens from a blank of resinous material. Under normal conditions, however, the die or mold carrying members 16 and 17 will cool sufficiently rapid after the heating fluid has been stopped in circulation therethrough to permit the formed lens blank to be removed therefrom within a reasonable period of time.

A control valve 25 is positioned in the return conduit 22 from the mold or die carrying member 16, while a control valve 26 is provided in the return conduit 21 from the heating coil 11 of the enclosure 10. The fluid circulating through either the mold carrying members 16 and 17 or through the heating coil 11 may thus be individually controlled to control the quantity of fluid flowing therethrough and thus the temperature thereof. This manner of temperature control of the die carrying members 16 and 17 and heating coil 11 is in addition to an automatic control of the temperature of the fluid within the tank 12.

The press 20, for forming the pressing or forming operation, is of conventional construction and is diagrammatically represented. The press generally consists of a fluid actuating cylinder 30 having a plunger 31 extending therefrom. The plunger 31 carries a platen 32 which is guided upon the rods 33. The platen 32 carries the upper die or mold carrying member 16. The lower die or mold carrying member 17 is suitably positioned and carried upon the bed 34 of the press. The press controls and actuating elements are well known in the art and further description of the same is not believed necessary.

The interior of the enclosure 10 is maintained at an elevated temperature, considerably above room temperature, by means of the heating coil 11. A plurality of pairs of dies 35, and a plurality of blanks 36 of resinous material are adapted to be placed within the enclosure 10 for elevating the temperature thereof. When molding a large number of lenses upon a press, it is of particular advantage to have the die members and the lens blank heated to within the range of molding temperatures at which the lens blanks are to be worked. The pre-heating of the dies and the blanks of resinous material eliminates the necessity of heating the blanks of resinous material after being positioned between the dies and within the press. The lens blanks 36 and the dies 35 are completely surrounded by the high temperature atmosphere within the enclosure 10, the pre-heating of the dies 35 and the blanks of resinous material 36 will save considerable operating time. The lens blanks can be pre-heated either within the dies or be heated separately therefrom.

The heating of the die carrying members 16 and 17, by the fluid circuit heretofore described, retains the dies 35 at molding temperature throughout the molding operation, hence, the temperature of the blank of resinous material is maintained substantially constant.

The deformation rate of a blank of resinous material is predetermined according to the temperature at which the blanks are to be worked. This deformation rate is of a determined order and cannot be greater than a rate which has been predetermined to be the maximum rate at which a blank of resinous material can be deformed at the particular temperature at which it is to be worked. Since the die elements 35 and the blanks of resinous material are pre-heated to the same temperature, and are uniformly heated, the maximum temperature of the same can be controlled. The die members 35 and the blank 36 can be removed from the interior of the enclosure 10 and the blank 36 be positioned within the mold 35 if the blank has not been pre-heated while between the die members. This unit, comprising the die elements 35 and the blank 36, is then positioned within the press 20.

Figure 2:
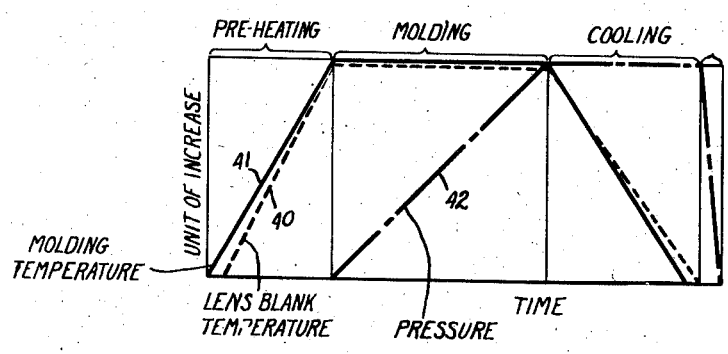
Figure 2 is a curve chart representing the various steps of the method and the temperatures and rates of formation encountered.

The temperature of the blank 36 and die elements 35 is indicated by the lines 40 and 41 respectively, see Figure 2. It may thus be seen, by referring to the chart of Figure 2, that the first step of pre-heating brings the die elements and blank up to molding temperature. The pre-heated unit may then have pressure applied upon the die elements by the press 20. The rate of increasing pressure application by the press 20 upon the die elements 35 has been predetermined to be the proper rate for forming the pre-heated lens blank at the temperature at which it is to be worked. This increasing rate of pressure application can be controlled either manually or automatically, however, the rate never exceeds the predetermined rate. During the forming operation, the pressure is gradually increased upon the die elements 35 as indicated by the line 42 of the chart of Figure 2.

Upon completion of the forming operation, the die elements 35, which have been positioned in the press 20 and retained at molding temperature by the fluid circulating through the die carrying elements 16 and 17, may be cooled either by the circulation of fluid through the mold carrying members 16 or 17, or by closing the valve 25 which stops circulation of heating fluid. The cooling of the die and blank of resinous material causes the lens blank to set in its altered shape, and may thereafter be removed from the dies upon release of pressure by the press 20.

As heretofore described, the die elements and the blanks of resinous material were pre-heated within an atmosphere at elevated temperature, as individual units, and were subsequently placed in their proper relation prior to the insertion of the thus assembled unit into the press. To insure an absolute and uniform heating of the die elements and the blank of resinous material, we prefer to assemble the die elements and a blank of resinous material as units prior to preheating, and pre-heat such assembled elements as a unit. Further, we prefer to provide an arrangement wherein a blank of resinous material is positioned between the optical surfaces of a pair of die elements, and to position the die elements in spaced relationship, the surfaces of the blank being under no pressure during the pre-heating thereof. We prefer to arrange the die elements in spaced relationship to prevent local overheating or the heating of local spots for a longer period of time than other portions of the blank of resinous material positioned therebetween. If a blank of resinous material is positioned between dies having curved surfaces and the assembly is pre-heated to elevate the temperature of the assembly to molding temperature and the dies are permitted to contact the resinous blank the points of direct contact between the blank and the dies are brought up to temperature relatively soon. These spots are retained at the elevated temperature over a longer period of time than are those areas which are not contacted directly. We have found that these local "hot spots" have resulted in changes of the optical properties of the material, particularly in a change in the index of refraction of the material in the area of the "hot spot." This condition of local "hot spots" is particularly acute when the blank of resinous material is placed between optical surfaces which are curved. When producing planos the fact that the plano surface rests substantially evenly over the surface of the die prevents local overheating. Nevertheless, if the dies are spaced apart the imperfect thermal contact between the plano surface and the die permits the blank to heat up evenly.

To provide an assembly which can be pre-heated as a unit, we provide a pair of die elements 45 and 46. These die elements 45 and 46 may have formed therein optical surfaces which are either plano or curved surfaces, which surfaces may be formed within the face of the dies, or may be provided in the nature of inserts 47 and 48 placed in the dies 45 and 46 respectively. These inserts are preferably of glass, which produces the exacting surface finish required for optical surfaces.

The die elements 45 and 46 are adapted to be retained in spaced vertical relation by means of a sleeve 49 positioned therearound. This sleeve 49 is provided with over-lapping ends as indicated at 50, to permit a certain degree of expansion thereof. The dies 45 and 46 are provided with relatively accurate circumferences so that the sleeve 49 will axially align the centers of the die elements 45 and 46, and thus will align the inserts 47 and 48 in an axial manner. A tightening band 51 is positioned around the sleeve 49 substantially midway between the ends thereof, which locates the band 51 at substantially the horizontal middle of the die members 45 and 46. This band 51 may be tightened by the screw 52 to retain the sleeve 49 in frictional engagement with the die elements 45 and 46.

The die elements 45 and 46 may thus be assembled with a blank of resinous material 52 positioned therebetween. The assembly of the die elements 45 and 46 is such that they are retained in spaced relation with respect each other so that the blank of resinous material 52 is not contacted by the curved faces of the dies over the area from which the lens or plano will be produced. While the surface of the plano will be more closely associated with the die surface upon which it is positioned, yet the fact that there is no pressure applied thereon will reduce the effectiveness of thermal contact therewith and thus prevent any local overheating. If desired, small projections can be provided to raise the plano surface slightly from the surface of the die. The sleeve 49 is tightened upon the die elements 45 and 46 by means of the band 51, whereby the assembly may be positioned within an oven or heating enclosure 10a for pre-heating.

The sleeve 49 encircles and encloses the annular space between the die elements 45 and 46 after once assembled. Since the sleeve 49 remains upon the die elements 45 and 46 during the pre-heating and the subsequent pressing or forming operation, foreign matter will be excluded from within the annular space between the die elements, which matter would tend to injure the surface of the blank upon formation thereof, and the die surfaces are retained out of good thermal contact with the resinous blank during the entire pre-heating operation.

The units comprising the dies 45, 46 and the blank of resinous material 52 are elevated to a determined temperature within the enclosure 10a. Since the enclosure 10a is retained at substantially a constant temperature in a manner similar to the enclosure 10, the units may be retained within the enclosure for any period of time to insure a uniform heating of the dies and blank of resinous material.

The pre-heated unit upon reaching its ultimate temperature can be removed from the pre-heating enclosure 10a and be positioned between the pressing platens of a press.

The pressing platens 53 and 54 can be heated by any suitable means, such as the fluid circulating passages 55 (see Figure 3). The pressing platen 54 is preferably positioned upon a resilient support member 56 which in turn is supported by the press base 57. The resilient support member 56 may take the form of a block of soft rubber or a plurality of springs may be positioned between the pressing platen 54 and the base 57 to resiliently support the platen 54. We do not wish to limit ourselves to the use of any specific resilient supporting means, but rather the resilient support 56 may take any form which will permit the pressing platen 54 to displace itself angularly with respect the base 57. The upper pressing platen 53 is secured to the plunger 58 which extends from the power source for the press, and provides the means for applying pressure upon the pre-heated unit positioned between the platens 53 and 54. The platen 53 is secured to the plunger 58 by means of a resilient member 59, which may take the form of a block of soft rubber which is vulcanized to both the platen 53 and the plunger 58, whereby the platen is resiliently secured to the plunger to permit angular displacement of the platen with respect the plunger.

The vertical axis of the resilient support 59 is arranged in alignment with the vertical axis of the platen 54. While this is not essential since the platen is entirely resiliently supported, yet it is convenient from a constructional standpoint. The preheated die unit, containing a blank of resinous material, is positioned between the platens 53 and 54 so that the central axes of the die members 45 and 46 are in substantial alignment with the vertical axis of the plunger 58.

When molding an article which has opposite surfaces which are equidistantly spaced between a pair of die surfaces the resilient mounting of the die surfaces will result in the surfaces aligning themselves equidistantly when pressure is applied thereto. This is a normal result obtained by pressing a mass of material between two equidistantly spaced surfaces if the pressure is applied to the die surfaces at the central point thereof. If the center of the mass of material to be formed is arranged substantially in coaxial alignment with the axis of the die surfaces the pressure applied by the die surfaces to the mass will tend to evenly distribute over the entire surface area of the mass. This condition will be true when the article to be produced is an article having equidistantly spaced surfaces, or as long as the surfaces have curvatures which are symmetrical or asymmetrical. That is, these surfaces must be surfaces of a sphere in order to produce this result. The resilient mounting of the platens 53 and 54 permit these platens to assume any angle required in order to permit the surfaces of the die to assume a relation wherein the pressure applied to the mass between the dies is evenly distributed over the entire surface area.

As heretofore described, the die members 45 and 46 are held in spaced relation by means of the friction engaging sleeve 49. However, when the plunger 58 moves the platen 53, the die member 45 will be moved within the sleeve 49 to approach the die member 46, whereby the blank of resinous material 52 will be caused to assume the optical curvature placed on the faces of the die inserts 47 and 48.

The sleeve 49 retains the dies 45 and 46 in substantial axial alignment. However, for various reasons there may be slight mis-alignment of the surfaces of optical curvature of the die inserts 47 and 48. That is, when producing an article for optical work which has parallel and equidistantly spaced optical surfaces, the curvature or plano surface of the die insert 47 may not match or be equidistantly spaced from the curved or plano surface of the die insert 48 when the same are assembled within the sleeve 49. Such a condition would result in slight angular mis-alignment of the axes of the die inserts 47 and 48. Any slight angular axial mis-alignment of the optical plano or curved surfaces of the die inserts will be corrected by the resiliently mounted press platens 53 and 54 of the mechanism heretofore described since the die 45 and the die 46 are pressed together by means of the resiliently mounted pressing platens 53 and 54.

Since the opposing optical surfaces of the die inserts 47 and 48 are moved toward each other by means which are resiliently mounted, the two surfaces will approach one another in a manner such that the force compressing the material therebetween will tend to evenly distribute over the entire area of the compression surfaces to position the surfaces equidistantly and establish the surfaces in coaxial alignment. This condition holds true for all optical articles which have symmetrical surfaces or surfaces which are surfaces of asymmetrical spheres. The sleeve 49, not being a solid cylinder, will permit the die 45 to align itself with the die 46 since the ends of the sleeve 49, as represented at 50, may slide with respect each other to permit slight angular displacement of the dies.

The construction of the press just previously described will absorb all slight angular misplacement between the platens 53 and 54. However, there are times when the angular misplacement between the platens may be greater than what is usually considered a normal angle of misplacement. Under these conditions the platen 53 may need to move laterally as well as angularly to permit the proper parallel relation to be assumed by the faces of the dies 47 and 48. It is therefore advisable to mount the plunger 58 within a resilient or floating bearing which will permit the plunger to move transversely about a pivot point.

As disclosed in Figure 7, the plunger 58 is connected to a pressure motor 65, such as a diaphragm bellows, for reciprocating the plunger 58 and the platen 53 for forming the mass of material placed within the die elements 45 and 46. The plunger 58 may be pivotally secured to the diaphragm motor 65, or if the diaphragm of the motor 65 is flexible the plunger can be secured directly thereto.

A floating bearing support 66 is provided around the plunger 58 in order to resiliently guide the same in a vertical direction and yet is sufficiently resilient to permit the plunger 58 to move transversely of its axis. The floating bearing consists of a collar 67 which surrounds the plunger 58 and in which the same can slide. The collar 67 is secured within a resilient diaphragm 68 which may be constructed of rubber or some other material which has considerable elasticity. The diaphragm 68 is suitably mounted to a rigid support 69 for positioning the same and the collar 67 with respect the plunger 58. While the resilient support has been mentioned as a rubber diaphragm 68, yet this support need not be a solid diaphragm element but can be a web structure or can be a plurality of individual flexible webs interposed between the collar 67 or the stationary mount 69.

The flexible bearing support for the platen 53 permits initial engagement of the die element 45 at a considerable angle and yet will permit sufficient lateral movement of the plunger 58 that the platen 53 will parallel itself with respect the platen 54 and the die elements 45 and 46. Under the condition wherein the platen 53 engages the die element 45 at a considerable angle and initially engages the die element at a point indicated A, it can readily be seen that vertical movement of the plunger 59 represented by the arrow B will be accompanied with an arcuate movement as indicated by the arrow C, the movement being about the pivot point "A" whereby the platen 53 will of necessity move laterally as indicated by the arrow D in order to parallel itself with the platen 54 and with the top surface of the die element 45. By the structure herein disclosed, it can thus be seen that if the resilient mounting member 59 is insufficient to absorb all of the angular misplacement of the platen 53 with respect the die element 45, that the floating bearing support 66 will absorb any additional angular misplacement which cannot be absorbed by the rubber mounting 59.

The arrangement just described is particularly useful when producing an optical article having parallel and equidistantly spaced surfaces which are either plano surfaces or are surfaces of optical curvature, or can be used when producing lenses to prevent the production of prisms in the finished product due to slight mis-alignment of the die faces.

After the unit, consisting of the dies 45 and 46 with a lens blank 52 therebetween, has been preheated within the enclosure 10a to a determined molding temperature, the pre-heated unit may be worked in slightly different manners within the press for forming the blank 52 to the contour of the optical surfaces of the dies. If the press platens 53 and 54 are heated, the molding or forming temperature of the blank 52 and the dies 45 and 46 can be retained for an indefinite period of time, and whereby the rate of formation of the press of resinous material 52 can be exceedingly slow, if desired, or preferably is at the rate determined to be the proper rate not to produce optical strain within the finished lens. In any event, the molding temperature of the blank 52 is retained throughout the complete formation period thereof.

However, there are certain types of lenses which do not requre that the molding temperature be retained for so long a period, particularly those lenses which require very slight formation. In these instances it would not be necessary to heat the platens 53 and 54, since the residual heat of the pre-heated dies 45 and 46 is sufficient to maintain the blank 52 within the molding temperature range for the period of time required for forming. The determining factor as to the length of time the blank 52 will be retained within its molding temperature range is the mass of the dies 45 and 46. It may readily be seen that the larger the mass of material from which the dies 45 and 46 are made, the greater the amount of residual heat which will be retained from the pre-heating step. It is quite possible that if the mass of the dies 45 and 46 is sufficiently large, the heating of the platens 53 and 54 may be entirely dispensed with when forming any optical article.

Lenses of slight correction or optical planos are specific examples of optical articles which can be formed without the necessity of heating the pressing platens 53 and 54. When forming these optical articles, the movement of the mass of the blank of resinous material is very slight and hence the time required for molding is considerably shorter than for lenses of relatively high correction. When forming optical articles of these types by pre-heating the blank of resinous material and the forming dies as a unit, it has been found that the residual heat is sufficient to permit the complete formation of the article. Thus, under these cases the pressing platens 53 and 54 need not be heated and may actually be cooled.

While the form and embodiment disclosed and described constitutes a preferred form, yet it may readily be understood that we do not wish to limit our invention to the specific forms described but that the invention may be practiced by the use of any number of mechanical arrangements of apparatus, all of which come within the purview of this invention.

Having thus fully described our invention, what we claim as new and desire to secure by Letters Patent is:

1. A device for pre-heating a blank of resinous material comprising, a pair of die elements, said elements being arranged for the positioning of a blank of resinous material therebetween, at least one of said elements having an optically curved face, an elastic band encircling and frictionally engaging said die elements for positioning said elements in spaced axially aligned relation during preheating, said band permitting angular realignment of the optically curved faces upon forming pressure being applied to said dies.

2. A forming apparatus for axially aligning opposed die surfaces which consists of a pair of die elements having opposed forming surfaces, means encircling said die elements for frictionally holding the same in adjacent relation and in substantial coaxial alignment, resiliently mounted means for supporting said die assembly, and a second resiliently mounted means for applying pressure upon said die assembly, the resiliency of said last two mentioned means permitting angular displacement thereof with respect the means carrying the same to permit adjacent die surfaces to coaxially align when pressure is applied thereto.

3. A forming apparatus for axially aligning opposed die surfaces which consists of a pair of die elements having opposed symmetrical forming surfaces, means encircling said die elements for frictionally holding the same in adjacent relation and in substantial coaxial alignment, resiliently mounted angularly displaceable means for supporting said die assembly, and a second resiliently mounted angularly displaceable means for applying pressure upon said die assembly, the resiliency of said last two mentioned means permitting angular displacement thereof with respect the means carrying the same to equidistantly space adjacent symmetrical die surfaces and coaxially align the same when pressure is applied thereto.

4. A device for preheating a blank of resinous material comprising, a pair of die elements, said elements being arranged for the positioning of a blank of resinous material therebetween, at least one of said elements having an optically curved face, and means encircling and frictionally engaging said die elements for retaining said elements in spaced relation until pressure is applied thereto.

5. An apparatus for forming a mass of resinous material comprising a pair of die elements, means encircling and frictionally engaging said die elements for retaining said die elements in substantial axial alignment and in spaced relationship before pressure is applied thereto, means for moving one of said die elements with respect to the other and for applying pressure upon said die elements to press the same upon a mass of resinous material therebetween, and means constructed and arranged for resiliently supporting said pressure applying means to provide the same with freedom of lateral and angular movement with respect to said die elements upon contacting the movable die element and during movement thereof with respect to the other die element to prevent disturbance to the axial alignment thereof.

6. An apparatus for forming a mass of resinous material comprising a pair of die elements, means encircling and frictionally engaging said die elements for retaining said die elements in substantial axial alignment and in spaced relationship before pressure is applied thereto, means resiliently supporting said assembled die elements to provide freedom of angular axial movement of said assembled die elements while upon said supporting means, means for moving one of said die elements with respect to the other and for applying pressure upon said die elements to press the same upon a mass of resinous material therebetween, and means constructed and arranged for resiliently supporting said pressure applying means to provide the same with freedom of lateral and angular movement with respect to said die elements upon contacting the movable die element and during movement thereof with respect to the other die element to prevent disturbance to the axial alignment thereof.

7. A device for forming a mass of resinous material comprising, a resiliently mounted angularly displaceable die supporting plate, a platen, an actuating plunger, means supporting said platen from the end of said actuating plunger to permit angular displacement of said platen with respect to said plunger, said plunger being angularly displaceable with respect to the normal axis thereof, and a motor connected to said plunger for actuating the same, a forming die disposed between said plate and platen adapted to receive a mass of resinous material between the die surfaces, said forming die being thereby carried between floating press members to produce even distribution of pressure upon the mass of resinous material between the die surfaces whereby said surfaces align themselves to evenly distribute the plastic material therebetween.

8. A device for forming a mass of resinous material comprising, a floating die supporting plate, a platen, means floating said platen upon the end of an actuating plunger, a motor for actuating said plunger, means connecting said plunger to said motor to permit swinging movement of said plunger about a single center, and resiliently mounted means for guiding said plunger, said plate and platen being constructed and arranged for insertion of a forming die therebetween, whereby the die is compressed between floating members which align themselves with respect to the die surfaces in engagement therewith.

9. A device for forming a mass of resinous material comprising means supporting a die supporting plate to permit freedom of angular movement thereof, a platen, an actuating plunger, a motor for actuating said plunger, means supporting said platen on said plunger to permit freedom of angular movement thereof with respect to said plunger, and means supporting said plunger to permit freedom of angular movement thereof about a fixed center.

10. A device for forming a mass of resinous material comprising means floatingly supporting a die supporting plate, a platen, an actuating plunger, a motor for actuating said plunger, means floatingly supporting said platen on said plunger, said motor having means for supporting said plunger to permit freedom of movement of said plunger about a single center angularly with respect to the axis of said plunger, and resiliently mounted means for centering said plunger with respect to the axis of actuation thereof.

11. A device for forming a mass of resinous material comprising means floatingly supporting a die supporting plate, a platen, an actuating plunger, a motor for actuating said plunger, means floatingly supporting said platen on said plunger, said motor supporting said plunger and having means to permit said plunger to swing from a fixed center, and resiliently mounted means for centering said plunger with respect to the axis of actuation thereof, said plunger centering means permitting angular movement of said plunger with respect to the axis thereof upon transverse movement of said platen with respect to said plate.

12. A device for forming a mass of resinous material comprising means floatingly supporting a die supporting plate, a platen, an actuating plunger, a motor for actuating said plunger, means floatingly supporting said platen on said plunger, a forming die disposed between said plate and said platen, said motor supporting said plunger and having means to permit said plunger to swing from a fixed center, and resiliently mounted means for centering said plunger with respect to the axis of actuation thereof, said platen supporting means permitting angular movement of said platen with respect to the axis of said plunger upon contacting said die while said plunger centering means permits transverse movement of said platen with respect to the normal axis of actuation of said plunger.

13. A device for forming a mass of resinous material comprising, a resiliently mounted angularly displaceable die supporting plate, a platen, an actuating plunger, means supporting said platen from the end of said actuating plunger to permit angular displacement of said platen with respect to said plunger, said plunger being angularly displaceable with respect to the normal axis thereof, and a motor connected to said plunger for actuating the same, a forming die having curved forming surfaces disposed between said plate and platen adapted to receive a mass of resinous material between the die surfaces, said forming die being thereby carried between floating press members to produce even distribution of pressure upon the mass of resinous material between the die surfaces whereby said surfaces coaxially align themselves to evenly distribute the plastic material therebetween.

CHARLES V. SMITH.
FRANK P. WILLIAMS.